United States Patent [19]

Dachs et al.

[11] 3,878,151

[45] Apr. 15, 1975

[54] THICKENERS FOR PRINT PASTES COMPOSED OF CROSS-LINKED MALEIC ANHYDRIDE-ALKYL VINYL ETHER POLYMERS

[75] Inventors: Karl Dachs, Frankenthal; Karl Herrle, Ludwigshafen; Werner Scheuermann, Ludwigshafen; Adolf Blum, Ludwigshafen, all of Germany

[73] Assignee: Badische Anilin- & Soda-Fabrik Aktiengesellschaft, Ludwigshafen/Rheinland, Rheinland-Pfalz, Germany

[22] Filed: Oct. 30, 1972

[21] Appl. No.: 302,134

Related U.S. Application Data

[63] Continuation-in-part of Ser. No. 828,352, May 27, 1969, abandoned.

[30] Foreign Application Priority Data

May 28, 1968 Germany.............................. 1769466

[52] U.S. Cl. ........ 260/29.6 T; 117/15; 117/161 UT; 260/29.4 UA; 260/29.6 TA; 260/29.7 T; 260/78.5 R; 260/78.5 BB; 260/42.29
[51] Int. Cl. ............................................. C08f 45/44
[58] Field of Search... 260/29.6 T, 29.6 TA, 29.6 H, 260/29.6 ME, 29.6 MN, 78.5 R, 78.5 BB, 29.4 UA, 29.7 T; 117/15

[56] References Cited
UNITED STATES PATENTS

| | | | |
|---|---|---|---|
| 2,985,625 | 5/1961 | Jones ........................... | 260/78.5 BB |
| 3,002,940 | 10/1961 | Holloway ...................... | 260/29.6 H |
| 3,366,588 | 1/1968 | Booth .......................... | 260/29.6 TA |
| 3,372,978 | 3/1968 | Whitfield et al............ | 260/29.6 MN |
| 3,393,168 | 7/1968 | Johnson........................ | 260/29.6 TA |
| 3,436,378 | 4/1969 | Azorlosa et al................ | 260/29.6 H |
| 3,514,419 | 5/1970 | Darlow et al. ................. | 260/29.6 H |
| 3,712,873 | 1/1973 | Zenk ............................ | 260/29.6 MN |

*Primary Examiner*—Lucille M. Phynes
*Attorney, Agent, or Firm*—Johnston, Keil, Thompson & Shurtleff

[57] ABSTRACT

Thickeners for print pastes consisting of copolymers from maleic anhydride and a vinylalkyl ether and, if desired, other copolymerizable monomers and which have been cross-linked with polybasic amines or polyhydric alcohols and/or aminoalcohols and then neutralized with ammonia.

8 Claims, No Drawings

THICKENERS FOR PRINT PASTES COMPOSED OF CROSS-LINKED MALEIC ANHYDRIDE-ALKYL VINYL ETHER POLYMERS

This application is a continuation in part of U.S. Application Ser. No. 828,352 filed on May 27, 1969, now abandoned.

This invention relates to thickeners for print pastes which consist of copolymers which are based on maleic anhydride and a vinyl ether and which have been cross-linked with polybasic amines, polyhydric alcohols and-/or aminoalcohols and neutralized.

Print pastes always contain thickeners (besides dyes, binders and other auxiliaries) which give them the required degree of viscosity. The thickening agent should be compatible with the conventional components of a textile print paste and should not impair either the dye yield of the fastness of the print. In the case of prints which have been prepared with print pastes containing conventional thickeners, the dye yield is in many cases not satisfactory. This is a disadvantage. Another disadvantage is that prints prepared with conventional print pastes (that is print pastes containing conventional thickeners) are often sensitive to squeezing so that a lower dye yield is obtained. The composition and preparation of print pastes are described in detail in Dr. Louis Diserens, "Die neuesten Fortschritte in der Anwendung der Farbstoffe," Verlag Birkhauser, Basel, Switzerland, vol. 1 (1951), pp. 100–108, 121–160; vol. 2 (1949), pp. 2–11, 306–325, 385–389, and vol. 3 (1949), pp. 73–108, 255–331, which passages are hereby incorporated by reference.

It is an object of the present invention to provide thickeners for print pastes which enable print pastes to be prepared that give high dye yield, high brilliance and level shades of the prints, have low sensitivity to squeezing by the rollers of printing machines, and are stable to coagulation of the binder emulsions when pigments are used. Another object is to provide thickeners for print pastes based on mineral spirit in water emulsions which thickeners are so effective that only small amounts of mineral spirit are required. Another object is to provide thickeners for print pastes which can be easily washed out of the printed cloth.

Still another object of the invention is to provide thickeners for print pastes which combine all the said advantages.

We have found that these objects are achieved by thickeners for print pastes obtained by crosslinking a polymer derived from 10 to 70 mole% (with reference to all the monomers) of maleic anhydride, 20 to 70 mole% of an alkyl vinyl ether having 1 to 4 carbon atoms in the alkyl group and 40 mole% of one or more comonomers selected from the group consisting of vinyl chloride styrene, ethylene, propylene, acrylamide, methacrylamide and esters of acrylic acid methacrylic acid with alcohols containing 1 to 4 carbon atoms in an inert water-immiscible organic solvent with 0.2 to 5% by weight (with reference to the solids content of the copolymer) of a poly-basic amine, polyhydric alcohol and/or polybasic/polyhydric aminoalcohol and which has been neutralized with aqueous sodium hydroxide or preferably ammonia solution or by passing in gaseous ammonia.

The proportion of maleic anhydride in the copolymer is generally from 10 to 70 mole%, preferably about 50 that is 35 to 55 mole%. The fraction of vinyl ether in the copolymer is generally from 20 to 70 mole%, preferably 30 to 50 mole%. Suitable vinyl ethers include the methyl, ethyl, n-propyl and isopropyl ethers and particularly the isobutyl and n-butyl ethers which are easily accessible industrially. For modification of the properties of the copolymers up to 40 mole% of other comonomers such as aryl amide and methacrylamide, esters of acrylic acid or methacrylic acid with alcohols containing 1 to 4 carbon atoms, vinyl chloride, styrene, ethylene, propylene and acetic or propionic esters of vinyl alcohol may be used.

The K value according to Fikentscher is advantageously from 60 to 100; copolymers having a K value of from 80 to 100 are preferred.

The copolymers may be prepared by conventional methods, preferably in an inert organic diluent.

Crosslinking is carried out by prior art methods, for example according to U.K. Pat. No. 856,320, advantageously by adding crosslinking agents to a suspension in an inert organic diluent which is not miscible with water. It is advantageous to use a suspension such as is obtained by precipitation polymerization. Finely particled polymer suspensions such as are obtained by the method of U.K. Pat. No. 1,063,056 are particularly suitable.

Polyhydric alcohols such as glycol, butanediol, glycerol, sorbitol and/or polybasic amines such as ethylenediamine, hexamethylenediamine, diethylenetriamine and/or aminoalcohols such as monoethanolamine, diethanolamine, triethanolamine and propanolamine are suitable for crosslinking.

After having been crosslinked, the suspensions obtained are neutralized with aqueous ammonia solution or gaseous ammonia, advantageously while stirring; neutralization with a sodium hydroxide solution is also possible; a suspension is thus obtained in the form of a viscous paste whose solids content is advantageously adjusted to from 20 to 35% by weight. Pastes of the thickener having a solids content of more than 35% by weight or less than 20% by weight may however also be prepared and used. Print pastes contain (besides the other components of a textile print paste) advantageously from 0.5 to 20% by weight (with reference to the print paste as a whole) of said thickener pastes i.e., the print pastes advantageously contain from 0.1 to 7% by weight (with reference to the whole of the print paste) of solid thickener (=solids from the paste of thickener).

In special cases it is even possible to neutralize the crosslinked copolymer with aqueous ammonia solution in the print paste.

The crosslinked polymer suspension (thickener paste) may be stabilized against sedimentation by adding a polymer which is soluble or swellable in the organic diluent, for example based on acrylic esters, methacrylic esters or vinyl esters.

Conventional textile assistants, for example emulsifiers, may also be incorporated into the suspension of the crosslinked copolymer.

The print pastes containing thickeners according to the invention may contain dyes of all types provided they are suitable for printing fibers, for example vat dyes, direct dyes, disperse dyes, reactive dyes and metal complex dyes. Pigment dyes may also be applied with a high yield when using the print pastes in the presence of binders. Such binders are well known in the art. They are polymers, preferably copolymers, which are soft without being sticky, for example copolymers of esters of acrylic or methacrylic acid and aliphatic alcohols with 1 to 4 carbon atoms with such comonomers as styrene, butadiene, vinylchloride, acrylonitrile, acrylamide, N-methylol-acrylamide, 1,4-butanediol-mono- and di-acrylate. Examples for such copolymers are those of n-butyl acrylate (or butadiene), styrene, N-methylolacrylamide, and acrylic acid neutralized after copolymerization with ammonia, or of n-butyl acrylate, acrylonitrile, vinylchloride and N-methylolmethacrylamide, or of a mixture of n- and t-butyl acrylates and acrylic acid. Such polymers may be applied in combination with amino plast precondensates prepared e.g., from urea or its cyclic or acyclic derivatives or melamine and formaldehyde.

Prints prepared with print pastes containing thickeners according to this invention have the following advantages over prints which have been prepared with print pastes which contain conventional thickeners:

a. with the same amount of dye in the print paste, much more dye is fixed on the cloth when using the new thickener than when using a conventional thickener. The dye yield and the brilliance of the prints are thus decisively increased;

b. the prints are not sensitive to squeezing by the rollers of printing machines;

c. the thickener according to the invention present in print pastes acts as a leveling agent so that particularly level shades are obtained.

d. the thickener present in the print paste acts as an emulsifier so that pigment print pastes which contain a pigment binder lend themselves for use on textile printing machines;

e. as compared with print pastes which contain thickeners based on copolymers of other polymerizable carboxylic acids, the thickeners according to the invention are far more stable to electrolytes;

f. when print pastes containing thickeners according to the invention are used with dyes which require a wet aftertreatment, the thickener can be washed out far more readily from the printed cloth than conventional thickeners;

g. the print pastes containing thickeners according to the invention save up to 60% of the amount of mineral spirit otherwise required in pigment print pastes.

The print pastes are obtained in the conventional way by stirring together the thickener, water, dye and if desired mineral spirit (boiling range 140° to 220°C). When using pigment dyes, a film-forming aqueous copolymer dispersion is also added to the print paste.

The invention is illustrated by the following Examples. The parts and percentages specified are by weight.

EXAMPLE 1

100 parts of a 40% suspension of a copolymer of 50 mole% of maleic anhydride and 50 mole% of vinyl isobutyl ether in toluene is crosslinked while stirring by adding 1.5 parts of hexamethylenediamine (temperature 40°C) and then 30 parts of a 25% ammonia solution is added. After neutralization has taken place, 20 parts of water is added and the mixture is stirred into a highly viscous paste.

35 parts of this paste is mixed with 430 parts of water, 35 parts of an about 40% dispersion of a film-forming polymer obtained by copolymerizing
49% acrylic acid, n-butyl ester,
22% vinyl chloride
19% acrylonitrile
8% acrylic acid methyl ester and
2% acrylamide
in a conventional manner is added and the whole is emulsified with 200 parts of mineral spirit (boiling range 140° to 220°C) with vigorous stirring. 500 parts of the emulsion obtained is stirred with 100 parts of a 21% aqueous formulation of Vat Blue C.I. 69800. 400 parts of water is added. A finished print paste is obtained which is used on textile printing machines in the usual way.

When used for printing on roller printing machines, prints are obtained which are not sensitive to squeezing and which give a far better dye yield than print pastes which contain conventional thickeners.

EXAMPLE 2

100 parts of a 40% suspension of a copolymer of 50 mole% of maleic anhydride and 30 mole% of vinyl methyl ether and 20 mole% of vinyl propionate in toluene is crosslinked while stirring by adding 0.8 part of glycol (temperature 50°C) and then neutralized with 30 parts of a 25% ammonia solution. When neutralization is over, 20 parts of water is added and the mixture is stirred to form a highly viscous paste.

40 parts of this paste is mixed with 400 parts of water, then 130 parts of an about 40% dispersion of a film-forming copolymer of 72% acrylic acid n-butyl ester, 24% acrylonitrile and 4% N-methylol acrylamide is added and the whole is emulsified with 400 parts of mineral spirit (boiling range 140° to 200°C) while stirring well. The emulsion thus obtained has added to it 30 parts of an about 25% aqueous phthalocyanine pigment paste, and 1,000 parts of a finished print paste is obtained which is used on textile printing machines in the usual way.

A dye yield which is from 20 to 30% higher is obtained in screen printing and roller printing than with print pastes prepared with conventional thickeners.

EXAMPLES 3 to 10

100 parts of a 40% suspension in toluene of the copolymer having the composition given in the Table is crosslinked by stirring with $x$ parts of crosslinking agent in the manner described in Example 1, and the mixture is made into a paste. The resultant pastes have the same properties as those obtained according to Examples 1 and 2.

| Ex. | Copolymer of maleic anhydride mole% | vinyl isobutyl ether mole% | crosslinking agent parts |
| --- | --- | --- | --- |
| 3 | 50 | 50 | 1.3 diethylenetriamine |
| 4 | 50 | 50 | 0.8 ethanolamine |
| 5 | 50 | 50 | 1.9 triethanolamine |
| 6 | 50 | 50 | 1.0 propanolamine |
| 7 | 50 | 50 | 1.4 diethanolamine |
| 8 | 50 | 50 | 0.8 glycol |
| 9 | 50 | 50 | 1.2 butanediol-(1,4) |
| 10 | 50 | 50 | 1.2 glycerol |

Printing pastes obtained by using thickeners of Examples 3 to 10 according to the instructions contained in Example 1, 2, 19, 20 or 21 give level prints free from specks on polyamide, polyester or cotton cloth. The yield of dye is 10 to 30% higher than with print pastes based on conventional thickeners.

EXAMPLES 11 to 18

100 parts of a 40% suspension in toluene of the copolymer having the composition given in the Table is crosslinked by adding x parts of crosslinking agent in the manner described in Example 2 and the mixture made into a paste containing approx. 35% of solids. The resultant pastes have the same properties as those obtained according to Examples 1 to 10.

| Ex. | Copolymer of maleic anhydride mole% | vinyl ether CH$_2$=CH—OR mole% | R | additional comonomer mole% | crosslinking agent parts |
|---|---|---|---|---|---|
| 11 | 50 | 30 | CH$_3$ | 20 vinyl propionate | 0.8 ethanolamine |
| 12 | 50 | 40 | CH$_3$ | 10 styrene | 1.4 diethanolamine |
| 13 | 50 | 40 | i—C$_4$H$_9$ | 10 vinyl propionate | 1.9 triethanolamine |
| 14 | 50 | 40 | CH$_3$ | 20 vinyl acetate | 1.2 butanediol-(1,4) |
| 15 | 50 | 30 | CH$_3$ | 20 ethylene | 1.3 glycerol |
| 16 | 50 | 30 | i—C$_4$H$_9$ | 20 propylene | 1.0 propanolamine |
| 17 | 50 | 30 | CH$_3$ | 20 ethyl acrylate | 0.8 ethylenediamine |
| 18 | 50 | 40 | i—C$_4$H$_9$ | 10 vinyl acetate | 1.5 hexamethylenediamine |

Print pastes obtained by using thickeners of Examples 11 to 18 according to the instructions contained in Example 1, 2, 19, 20 or 21 give level dyeings free from speeks. The yield of dye is from 10 to 20% or even 30% higher than with print pastes based on conventional thickeners.

EXAMPLE 19

100 parts of the thickening paste obtained according to Example 4 is stirred together with 800 parts of water and 100 parts of a conventional (3 wt.% alginate) thickening. Then 50 parts of an aqueous formulation of a disperse dye obtained by coupling 4-aminoazobenzene with o-cresol is added and the whole is stirred to give a homogeneous paste. The paste is printed on polyester cloth on a roller printing machine. After drying and fixing with steam or hot air followed by washing, level and brilliant prints are obtained. The yield of dye is about 20% higher than when using a print paste containing only a conventional thickener.

EXAMPLE 20

140 parts of the thickening paste obtained according to Example 13, 550 parts of water, 40 parts of potassium carbonate and 150 parts of urea are stirred together and emulsified in 120 parts of mineral spirit (boiling range 140° to 220°C) with vigorous stirring.

50 parts of the red reactive dye obtained by coupling aniline-4-sulfonic acid with 1,β-(4,5-dichloropyridazonyl-1)-propionylamino-8-hydroxynaphthalene-3,6-disulfonic acid and 150 parts of water are stirred with 800 parts of the above emulsion. The paste is printed on cotton by screen printing. After fixing by steaming at 120° to 150°C and subsequent washing, level prints free from specks are obtained.

The yield of dye is 10 to 20% higher than when using print pastes containing only conventional thickeners.

EXAMPLE 21

50 parts of thiourea, 40 parts of thiodiglycol, 10 parts of ammonium sulfate and 80 parts of a liquid formulation of a yellow chromium complex dye are dissolved in 600 parts of water. The dye is prepared by coupling anthranilic acid with 1-phenyl-3-methylpyrazolone-5 and chroming the coupling product. 120 parts of the thickening paste obtained according to Example 3 is stirred into the above solution and the resultant print paste is printed on polyamide fabric by screen printing. After fixing and finishing off, brilliant and level speck-free prints are obtained. Again the dye yield is 10 to 20% higher than when using print pastes on conventional thickeners.

EXAMPLE 22

A print paste is prepared from 50 parts of a 30% aqueous phthalocyanine pigment (C.I. No. 74 160) paste and 950 parts of a mineral-spirit-in-water emulsion containing 50% mineral spirit, 1% of a reaction product of n-nonylphenol and 20 moles ethylene oxide, 15% of a 40% aqueous dispersion of a copolymer of 40 parts butyl acrylate, 30 parts acrylonitrile and 30 parts vinyl chloride, 3% of a copolymer of maleic anhydride and vinyl isobutyl ether prepared and crosslinked according to Example 1, para. 1, and 31% of water.

The paste gives prints with particularly high color yield and good brilliance on all classes of fiber.

EXAMPLE 23

A print paste is prepared by stirring together, using a highspeed stirrer, 40 parts of a 40% aqueous azo pigment paste (C.I. No. 21,100) and 960 parts of a mineral-spirit-in-water emulsion containing 45% mineral spirit, 0.8% of the reaction product of o-phenyl-p-benzylphenol and 12 moles ethylene oxide, 12% of a 40% aqueous dispersion of a copolymer of 60 parts butadiene-1,4 and 40 parts styrene, 2.5% of a maleic anhydride/vinyl isobutyl ether copolymer prepared and crosslinked according to Example 2, para. 1, and 39.7% water.

Prints prepared with the paste on 65/35 polyester/rayon staple fabrics show particularly high color yields on the surface.

EXAMPLE 24

A print paste is prepared by mixing the following components: 30 parts of a 30% aqueous phthalocyanine pigment (C.I. No. 74 260) paste;
60 parts of a maleic anhydride/vinyl isobutyl ether copolymer prepared and crosslinked according to Example 1, para 1;
120 parts of a 45% aqueous dispersion of a copolymer of 70% butadiene-1,4 and 30 parts acrylonitrile;
40 parts di-n-octyl phthalate;
15 parts urea; and
735 parts water.

EXAMPLE 25

100 parts of a 40% suspension of a copolymer of 50 mole% maleic anhydride, 40 mole% vinyl isobutyl ether and 10 mole% methacrylamide in toluene is crosslinked by adding 1.2 parts hexamethylene diamine with stirring at 40°C. The toluene is removed by spraying the suspension into a stream of nitrogen in conventional manner, a fine and dry powder being obtained.

30 parts of this powder is added with mechanical stirring to 970 parts of a 0.5% aqueous NaOH solution. A highly viscous paste is obtained after a short time.

Into 700 parts of this paste there are stirred by means of a high-speed stirrer, 120 parts mineral spirit (boiling range 140°–200°C), 150 parts urea and 30 parts sodium bicarbonate. 800 parts of this thickening is mixed with 40 parts of the reactive dye C.I. No. 18,105 and 160 parts water.

The resultant finished print paste is applied in the usual manner and the print fixed and aftertreated as usual with reactive dyes.

As compared with prints containing conventional thickeners the color yield is 15–25% higher and the prints are much more level.

EXAMPLE 26

100 parts of a 40% suspension of a copolymer of 50 mole% maleic anhydride and 50 mole% vinyl isobutyl ether in toluene is crosslinked by adding 1.2 parts ethylene diamine with stirring at 40°C and then 30 parts of 25% ammonia solution is added. After neutralization 20 parts of water is run in and the mixture stirred to make a highly viscous paste.

100 parts of this paste is mixed with 800 parts of water and 100 parts of a 3% aqueous solution of a commercial alginate.

960 parts of this thickening is mixed with 40 parts of the disperse dye C.I. No. 12,790. The print paste is applied in conventional manner to polyester fabric using a textile printing machine. After drying the dye is fixed at 200°C for 1 minute in hot air and finished off as usual.

As compared with print pastes containing conventional thickeners prints showing much improved color yields are obtained.

EXAMPLE 27

100 parts of a 40% suspension of a copolymer of 50 mole% maleic anhydride, 35 mole% vinyl n-butyl ether and 15 mole% styrene in toluene is crosslinked by adding 1.5 parts hexamethylene diamine with stirring at 40° and then 30 parts of 25% ammonia solution is added. After neutralization 20 parts of water is run in and the mixture stirred to make a highly viscous paste.

100 parts of this paste is mixed with 800 parts water and 100 parts of a 10% aqueous solution of locust bean ether gum.

830 parts of this thickening is mixed with 20 parts of the acid dye C.I. No. 26,900, 50 parts thiodiglycol, 50 parts urea and 50 parts of a 33% ammonium sulfate solution. The resultant paste is applied in conventional manner to nylon knitted fabric on a textile printing machine. After drying, the dye is fixed at 102° to 104°C in saturated steam for 20 minutes and finished off as usual.

As compared with print pastes containing conventional thickeners, prints having clearly superior brilliance and levelness are obtained. The color yield is also higher.

EXAMPLE 28

100 parts of a 40% suspension in toluene of a copolymer of 40 mole% of maleic anhydride, 50 mole% of vinyl n-butyl ether and 10 mole% of butyl methacrylate is crosslinked while stirring by adding 0.8 part of ethylenediamine (temperature 40°C). The toluene is removed from this suspension in conventional manner by spraying in a current of nitrogen. In this way there is obtained a fine dry powder.

25 parts of this powder is stirred into 975 parts of a 0.5% aqueous solution of NaOH. After a short time a highly viscous paste is obtained.

To 900 parts of this paste there is added, while stirring with an impeller, 100 parts of a 20% aqueous suspension of Vat Green 1, C.I. No. 59,825.

The resultant print paste is printed on cellulose fabric by a conventional method and dried. As is usual in the two-stage process, the printed material is padded with an alkaline solution of a reducing agent and steamed. Finishing is effected in the manner which is usual for vat dye prints.

As compared with prints prepared with conventional thickeners, the dye yield is considerably higher and levelness is distinctly better.

EXAMPLE 29

100 parts of a 40% suspension in toluene of a copolymer of 35 mole% of maleic anhydride, 50 mole% of vinyl isobutyl ether and 15 mole% of methyl acrylate is crosslinked while stirring by adding 1.0 part of hexamethylenediamine (temperature 40°C), and then 30 parts of a 25% ammonia solution is added. When neutralization has been completed, 20 parts of water is added and the mixture is stirred until it is a highly viscous paste.

40 parts of this paste is mixed with 500 parts of water. Then 100 parts of an about 40% dispersion of a film-forming polymer is added and the whole is emulsified with 300 parts of mineral spirit (boiling range 140° to 220°C) while stirring vigorously. To the resultant emulsion there is added 60 parts of an about 25% aqueous paste of Pigment Green, C.I. No. 74,260. In this way 1000 parts of a print paste is obtained which is used on conventional machines for printing textiles.

The dye yield is 20 to 30% higher than when using print pastes based on conventional thickeners.

We claim:

1. A print paste for printing fibers and textile material, said print paste consisting essentially of (1) a dye selected from the group consisting of vat dyes, substantive dyes, disperse dyes, metal complex dyes, and pigment dyes, (2) water and (3) from 0.1 to 7% by weight, with reference to the total weight of the print paste of solids from a thickener which has been obtained by:
   a. crosslinking a copolymer of 10 to 70 mole% of maleic anhydride, 20 to 70 mole% of an alkyl vinyl ether having 1 to 4 carbon atoms in the alkyl group and 0 to 40 mole% of one or more comonomers selected from the group consisting of vinyl chloride, styrene, ethylene, propylene, acrylamide, methacrylamide, esters of acrylic acid and methacrylic acid with alcohols containing 1 to 4 carbon atoms and the acetic and propionic esters of vinyl alcohol, said percentages being with reference to all the monomers, in an inert water-immiscible organic diluent with from 0.2 to 5% by weight, with reference to the solids content of the copolymer, of a crosslinking agent selected from the group consisting of ethyleneidamine, diethylenetetramine, hexamethylenediamine, monoethanolamine, diethanolamine, triethanolamine, propanolamine, glycol, butanediol and glycerol, said crosslinking being effected by adding the crosslinking agent to the copolymer, and b. neutralizing said crosslinked copolymer by adding an aqueous solution of ammonia or sodium hydroxide or by passing in ammonia gas.

2. A thickener for print pastes as claimed in claim 1, which is a crosslinked copolymer of about 50 mole% of maleic anhydride and 30 to 50 mole% of an alkyl vinyl ether having 1 to 4 carbon atoms in the alkyl group.

3. A thickener for print pastes as claimed in claim 1, which is a crosslinked copolymer which has been produced by copolymerization of about 50 mole% of maleic anhydride, about 30 mole% of an alkyl vinyl ether and about 20 mole% of a comonomer selected from the group consisting of vinyl chloride, acrylamide, methacrylamide, styrene, ethylene, propylene, acetic and propionic esters of vinyl alcohol and esters of acrylic acid or methacrylic acid with alcohols containing 1 to 4 carbon atoms.

4. A thickener for print pastes as claimed in claim 1, which is a crosslinked copolymer of about 50 mole% of maleic anhydride, about 30 mole% of an alkyl vinyl ether having 1 to 4 carbon atoms in the alkyl group and about 20 mole% of a vinyl ester, the esters being derived from an acid selected from the group consisting of acetic and propionic acid.

5. A thickener for print pastes as claimed in claim 1, which is a crosslinked copolymer of about 50 mole% of maleic anhydride, about 30 mole% of an alkyl vinyl ether having 1 to 4 carbon atoms in the alkyl group and about 20 mole% of an ethyl ester of acrylic or methacrylic acid.

6. A thickener for print pastes as claimed in claim 1, which is a precipitation copolymer.

7. A thickener for print pastes as claimed in claim 1 which is crosslinked with ethylenediamine, diethylenetetramine, hexamethylenediamine, monoethanolamine, diethanolamine, propanolamine, glycol, butanediol or glycerol.

8. A thickener for print pastes as claimed in claim 1 which has a K-value according to Fikentscher of from 60 to 100.

* * * * *